Feb. 2, 1965   H. C. MILLER   3,168,379
APPARATUS AND METHOD OF PRODUCING BRINE
Filed Dec. 27, 1957
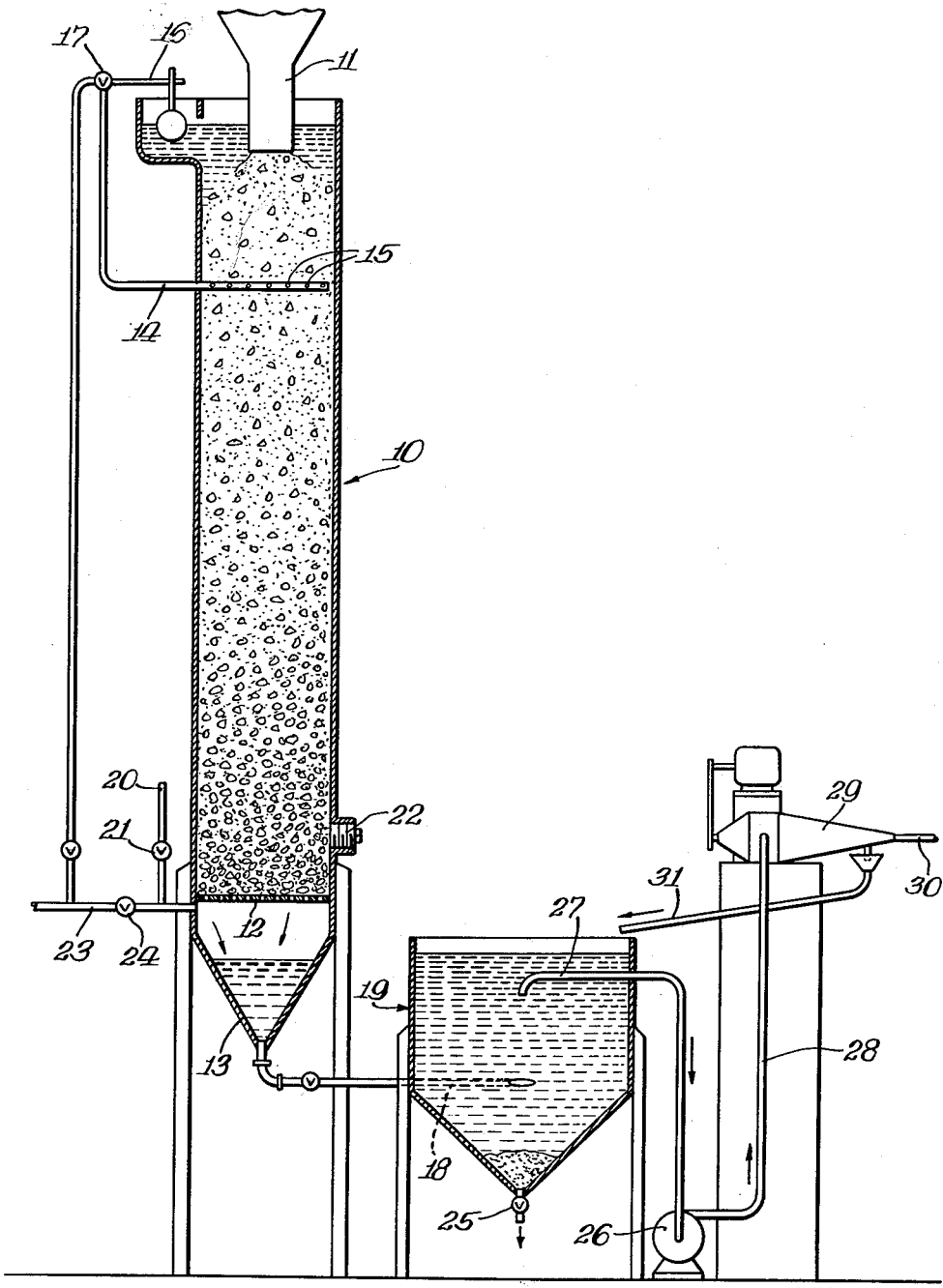
INVENTOR.
Howard C. Miller,
BY
Brown, Jackson, Boettcher & Dienner
Attys.

United States Patent Office 3,168,379
Patented Feb. 2, 1965

3,168,379
APPARATUS AND METHOD OF PRODUCING
BRINE
Howard C. Miller, Grand Saline, Tex., assignor to Morton
Salt Company, Chicago, Ill., a corporation of Illinois
Filed Dec. 27, 1957, Ser. No. 705,640
14 Claims. (Cl. 23—312)

This invention relates to an improved apparatus and method for dissolving rock salt and separating impurities therefrom in the production of a pure brine.

Further this application constitutes a continuation-in-part of my previously filed application, Serial No. 426,-739, filed April 30, 1954, now abandoned.

At the outset, it is my intention to describe the concepts and operating features of my new salt dissolver as it relates to the production of brine from rock salt. It will be appreciated, however, that the production of solutions, other than brine solutions also may be produced with my apparatus and according to my new method, although the description of this invention is related specifically to the production of salt brine.

It is well known in the art of making salt brine that rock salt contains calcium sulfate as a major impurity. Such is generally present as distinct particles of anhydrous calcium sulfate which are more slowly soluble than the rock salt. While knowledge of the different rates of solution for rock salt and calcium sulfate has been long recognized, its use as a practical concept in the production of a brine has been extremely limited before this invention.

Presently known commercial types of rock salt dissolvers generally seek to produce brine solutions by slowly passing water through a tank filled with rock salt, the said salt being continuously immersed in the water. Under such conditions of operation, a given portion of the solvent is, for a long period of time, in contact with the calcium sulfate particles present in the salt and released as the rock salt dissolves. This sustained immersion in brine results in increased dissolution of the particulate impurities and produces a brine saturated with calcium sulfate. In the manufacture of certain chemicals and in other industrial uses, the impure brine must be treated to remove both the calcium and sulfate ions. When large quantities of brine are used, this purifying treatment becomes very costly and small differences in brine purity are very significant.

Briefly, the salt dissolver of this invention seeks to overcome the above-outlined defects in that it provides a new concept for the production of salt brine having a high purity and which has specific adaptation for using Southern Rock salt containing slowly soluble calcium sulfate as a natural impurity. It is further a feature of this invention that the dissolver is substantially self-cleaning and its production rate of pure brine, or brine of a highly pure character is rapid.

Generally speaking, the salt dissolver of this invention may be termed a gravity flow type in which the solvent is free-flowing through a bed of salt crystals in a downward direction with very high solution velocities across the surface of the salt crystals to cause a washing out of the less soluble calcium sulfate impurities or particles. These particles are then carried completely through the salt bed before their separation from the brine solution. As a consequence, there is no build-up of calcium sulfate deposit in the dissolver and contact time of the brine solution with such impurities is, therefore, maintained at a minimum to produce a brine of high purity containing less than 0.2 gram per liter calcium sulfate when dissolving Southern Rock salt. This is substantially less than that obtained by conventional dissolvers presently employed in the brine-making practice.

One of the principal objects of this invention is the provision of a method and apparatus for dissolving rock salt, which at the same time efficiently flushes from the salt bed the undissolved and more slowly soluble impurities to the end that a brine of high purity is obtained in the final product.

Another object of the invention is to provide a salt dissolver which is substantially self-cleaning and which is productive of a high brine-making rate per unit cross-sectional area of the dissolver.

A further object of this invention is to provide a method and apparatus for producing a brine of high purity and saturation and which is capable of removing impurities from the brine in a substantially undissolved state.

The above and further objects, features, and advantages of the present invention will be recognized by those familiar with this art from the following detailed description of one embodiment of an apparatus to carry out the same, as illustrated in the accompanying drawings.

In the drawings:

The single figure shown illustrates a schematic layout for apparatus embodying the concepts and principles of this invention.

Before entering into the particulars of the equipment shown in the drawing, it is important to first examine the requirements and aspects of employing the differential of dissolution rates, as above-outlined, in the production of brine under this invention.

In order to determine the relative solution rates for rock salt and calcium sulfate impurities as well as the effect which might occur by the accumulation of the calcium sulfate impurities in the dissolving equipment, laboratory tests were conducted. In all these tests one part of finely crushed Southern Rock salt (200 gms.) was added to three parts of distilled water (600 gms.) and the mixture agitated. The same sample of rock salt was used in all tests and all the salt added in each test was dissolved in the mixing operation. An analysis of the test salt showed that upon agitating 50 grams in 600 ml. of distilled water for three hours the rock salt contained 2.75 percent water soluble calcium sulfate and .024 percent water insoluble material.

Table I below shows the effect of time on the dissolution of calcium sulfate in the brine solution. In all the tests in this group, the mixing equipment was cleaned between successive pairs of tests. After the mixing period indicated in the table the suspened impurities in the brine were allowed to settle for a five-minute period. A sample of unfiltered settled brine was then removed for analysis. The results indicate that the natural calcium sulfate impurity present in the rock salt is more slowly soluble than the salt and that short contact time between the solvent and the calcium sulfate particles must be practiced in order to produce a pure brine.

Table I

| Test No. | Minutes Salt Agitated in Water | Brine Analysis, Grams per Liter Calcium Sulfate in Solution |
|---|---|---|
| 1 | 0.5 | 0.34 |
| 2 | 1.0 | 0.37 |
| 3 | 2.0 | 0.40 |
| 4 | 5.0 | 0.52 |
| 5 | 10.0 | 0.70 |
| 6 | 20.0 | 0.96 |
| 7 | 40.0 | 1.48 |

In the group of tests shown in Table II the effect of accumulated undissolved calcium sulfate impurity on the resultant brine purity is demonstrated. In this group of tests the rock salt and water were agitated for the time interval indicated. At the end of the mixing period the suspended impurities in the brine were allowed to settle for a period of five minutes and a sample of the settled brine was then removed for analysis. The remaining settled brine was then removed from the container by decantation leaving the settled undissolved impurities in the bottom. A new sample of rock salt (200 gms.) and distilled water (600 gms.) was added and agitated for the period indicated. This procedure was repeated in each test of this group and the brine analysis results show very definitely the increased effect on brine purity produced by an accumulation of the undissolved calcium sulfate impurity in the dissolving equipment.

*Table II*

| Test No. | Time of Agitation, Minutes | Brine Analysis, Grams per Liter Calcium Sulfate in Solution |
| --- | --- | --- |
| 1 | 2 | 0.40 |
| 2 | 2 | 0.50 |
| 3 | 2 | 0.60 |
| 4 | 2 | 0.75 |
| 5 | 2 | 0.83 |
| 6 | 2 | 0.94 |
| 7 | 2 | 1.08 |
| 8 | 2 | 1.12 |
| 9 | 2 | 1.15 |
| 10 | 10 | 3.38 |
| 11 | 10 | 3.24 |

It is customary in most salt dissolver operations to have the salt immersed in water during the dissolving process. In order to check the effect of calcium sulfate impurity pick-up by the solvent in this type operation, a series of laboratory tests were conducted in which the rock salt used in the tests shown in Tables I and II was immersed in water for various time intervals. In this series of tests only sufficient water was added to the container to cover 500 grams of rock salt therein. No agitation of salt and solvent was empolyed. After the contact time indicated in Table III, the brine around the salt was removed on a Büchner funnel and analyzed for calcium sulfate pick-up. The results shown in Table III indicate a very high pick-up calcium sulfate from the salt bed when the salt is immersed in the solvent and, in fact, show a marked increase over the results obtained with agitation, as outlined in Table I.

*Table III*

| Test No. | Time of Contact Salt and Solvent, Minutes | Brine Analysis, Grams per Liter Calcium Sulfate in Solution |
| --- | --- | --- |
| 1 | 5 | 0.79 |
| 2 | 10 | 1.40 |
| 3 | 60 | 4.00 |

The techniques of operation in the present invention seek to overcome and reduce to a minimum all the above-described physical processes which reduce brine purity when dissolving rock salt containing natural forms of calcium sulfate as an impurity. The basic steps practiced in this new method and apparatus for producing a pure brine include the following: (1) The contact time of the solvent and the salt is held at a minimum for the results desired. This is achieved by unobstructed gravity flow of the solvent over the surface of the salt crystals. In a commercial operation it has been observed that the time interval of contact of the major portion of a given increment of the solvent in the salt bed is possibly no longer than thirty second. (2) The rapid flow of the solvent over the surface of the rock salt crystals effectively flushes from the salt bed the slowly soluble calcium sulfate particles, thereby making possible their immediate separation from the brine and preventing a build up of said particles in the salt bed through which the solvent is flowing. The test results shown in Tables I and II indicate that the major portion of the particles of undissolved calcium sulfate will settle very quickly from the brine in a gravity separation. (3) The bed of rock salt used to produce the brine is not statically immersed in the solvent as is commonly practiced in salt dissolver operations, but instead techniques of operation are used which allow a rapid gravitational flow of a film of the solvent over the surface of the rock salt crystals. This results in minimum contact time between solvent and impurity and an efficient flushing of the undissolved impurity from the rock salt bed.

Basically, the design of the apparatus and techniques of operation practiced in order to achieve the aforesaid objectives are very simple. A column of crushed rock salt containing a distribution of particle sizes ranking from very fine to nearly two inches in diameter is supported on a perforated plate or screen. Fresh water injected into the salt bed near the top of the column first dissolves the fine salt and leaves the bottom of the column filled only with larger particles of rock salt. These large particles form a labyrinth bed which helps support the finer particles; the latter being quickly dissolved to make brine. The particles of calcium sulfate released are then easily flushed by a gravity flow of the brine through the rock salt supporting bed and out of the dissolver with the brine where a separation is immediately effected.

Referring now to the drawings, it will be recognized that an apparatus is therein illustrated as comprising a substantially cylindrical dissolver tank, indicated generally by the numeral 10. To appreciate somewhat the relative dimensions of the vertical tank member 10 in a preferred form of dissolver presently employed, the same is constructed with a vertical height of approximately 12 feet, while the diameter thereof is two feet six inches. A hopper means 11 is provided over the open top end of tank 10 for the introduction of rock salt. A perforated plate support or screen member 12 is mounted transversely across the lower end of tank 10 for supporting the salt crystals thereabove. Support member 12 is perforated with numerous fairly sizable openings to provide for the free passage of brine solution and undissolved calcium sulfate particles therethrough. Beneath support member 12 is a conical bottom portion or cone 13 which may be attached to the lower end of tank 10, as shown, or detached therefrom, since it is my intention that the tank system of this dissolver be substantially open ended to facilitate free gravitational flow of water and brine through the dissolver. Solvent, namely water, is introduced to the tank 10 intermediate its ends and approximately adjacent the top end thereof via an inlet tube 14 having plural discharge openings 15, so that water may be injected into the bed of salt crystals. A float means 16 operates a cut-off valve 17 at the upper end of the tank to prevent brine overflowing that end of the tank.

In operation, a mine run crushed rock salt, which is a mixture of very fine and coarse rock salt, is fed into the dissolver unit through hopper 11. Water is injected through openings 15 and flows freely down over the salt bed under the influence of gravity and without any back pressure. As the water courses through the network of large and small crystals, the finer salt particles are initially dissolved allowing the downward flowing brine to carry therewith the slower dissolving impurities in particulate form for discharge into the cone 13. A discharge pipe or conduit 18 is connected to the apex of the cone 13 and leads tangentially into a settling tank 19, the conduit 18 providing free flow of the brine from cone portion 13 to the settling tank.

Since a large amount of air is carried through the dissolver with the brine solution, provision for permitting the same to escape from the brine is accomplished by means of a stand pipe 20 having a cut-off valve 21 therein and communicating with the upper end of the cone section 13 beneath perforated support member 12.

Although a dissolver of this construction effectively prevents large deposits of the impurities within the dissolver tank itself, a certain amount of trash and like articles will collect on perforated supported member 12. As a consequence, a clean out opening 22 is provided for hand clean out purposes on one side of tank 10 and a backwash water line 23, having a cut-off valve 24, is provided for assisting in the removal of such trash deposits from the screen.

The brine and undissolved calcium sulfate particles discharged from the dissolver enter settling tank 19 tangentially from the pipe 18, as noted, and the major portion of said particles immediately settle to the bottom for removal in particle form through valve 25. From tank 19, the settled brine is removed by a pump 26 through pipe 27 and is discharged through pipe 28 into a liquid separator or centriclone 29 where the remaining very finely suspended particles of undissolved impurities are removed. The clarified production brine is thereafter discharged through the overflow pipe 30 of separator unit 29. The underflow discharge from separator unit 29 which contains a concentration of the heavier undissolved impurities is returned as shown to settling tank 19 through pipe 31 for gravitational settling and removal.

In a commercial operation of the apparatus and method hereinbefore described and with a tank member 10 having a diameter of two feet and six inches, a production rate of approximately one hundred gallons per minute when dissolving Southern Rock salt produces a clarified brine having an average saturation of 99 percent and containing less than 0.2 gram per liter of calcium sulfate in solution. The solvent flow rate of approximately 20 gallons per minute for each square foot of cross-sectional area, results in completely flushing the slowly soluble impurities from the system.

From the foregoing description, it is believed that the merits and features of this invention will be readily appreciated and that it will be recognized that the same marks an advanced improvement in this art. The simplicity of design and directness of operation featured in the apparatus leads to a variety of obvious equivalent uses, changes and modifications so long as the basic concept is borne in mind that the solvent velocity must be maintained at a rate to permit free flow thereof across the salt bed. It must also be remembered that contact time of the solvent with the salt must be such as to permit the salt to dissolve without dissolving the less soluble calcium sulfate particles. Following these basic principles, one should be able to construct an efficient dissolver of this class without undue difficulty following the schematic layout of my principles as represented in the accompanying drawings.

In addition to the specific apparatus herein described, it is inherent that a new method or approach for the purification and production of brine in a rapid and efficient manner also has been disclosed. Specifically, my method seeks to flow the solvent across the salt particles at a flow rate regulated so that the salt will go into solution rapidly enough to manufacture a successful brine, while substantially preventing the less soluble calcium sulfate particles from going into solution.

With the above teachings in mind, then, it is obvious that numerous changes, modifications and substitutions of equivalents may be made in the features of this invention without necessarily departing from its spirit and scope. Consequently, it is not my intention that I be limited to the particular method and embodiment of dissolver herein disclosed and described except as may appear in the following appended claims.

I claim:

1. In a method of preparing brine by contacting a bed of rock salt containing calcium sulfate as an impurity with a downwardly flowing stream of water, the improvement which comprises forming a bed of said salt with the bottom of the bed communicating directly with an open space thereunder whereby brine effluent from said bed falls freely from said bed, and collecting the freely falling brine containing entrained solid impurities as a mass out of contact with the bottom of said bed.

2. A method in accordance with claim 1, wherein said bed is composed of rock salt of widely varying particle size.

3. A method in accordance with claim 1, wherein the flow of water through said bed is maintained at a rate insufficient to entirely fill the spaces between the salt particles forming the bottom of said bed.

4. A method in accordance with claim 1, wherein the flow of water through said bed is maintained at a rate which floods the upper part of said bed but is insufficient to entirely fill the spaces between the salt particles forming the bottom of said bed.

5. In a method of preparing brine by contacting a bed of rock salt containing calcium sulfate as an impurity with a downwardly flowing stream of water, and thereafter separating the brine from entrained solid impurities therein, the improvement which comprises forming a bed of said salt with the bottom of the bed communicating directly with an open space thereunder whereby brine effluent from the bed falls freely from said bed, collecting the freely falling brine containing entrained solid impurities as a mass out of contact with the bottom of said bed, and centrifugally separating said collected brine from the solid impurities contained therein before substantial dissolution of such impurities in the brine.

6. A process in accordance with claim 1, wherein the depth of said bed is about five times its diameter, and said water is introduced in said bed at a rate of about 20 gallons per minute per square foot of horizontal cross-sectional area of the bed.

7. In a method of preparing brine by contacting a bed of rock salt containing calcium sulfate as an impurity with a downwardly flowing stream of water, the improvement which comprises forming a bed of said salt with the bottom of the bed communicating directly with an open space thereunder whereby the brine effluent from said bed falls freely therefrom, collecting the freely falling brine containing entrained solid impurities as a mass out of contact with the bottom of said bed, and then separating brine so collected from the solid impurities contained therein before substantial dissolution of the impurities in the brine.

8. A process of preparing brine from rock salt containing calcium sulfate as an impurity, which comprises forming a bed of said salt of widely varying particle size, said bed having its bottom communicating directly with an open space thereunder, flowing a stream of water downwardly through said bed whereby brine formed by the dissolution of salt in said water falls freely from the bottom of said bed into said open space, collecting said freely falling brine together with solid impurities entrained therein as a mass out of contact with the bottom of said bed, and separating the collected brine from the said solid impurities before substantial dissolution of the latter in the brine.

9. A process in accordance with claim 8, wherein the depth of said bed is about five times its diameter, and said water is introduced in said bed at a rate of about twenty gallons per minute per square foot of horizontal cross-sectional area of the bed.

10. A process in accordance with claim 8, wherein said bed is continuously replenished by adding rock salt to the top thereof, water is continuously passed through said bed, and the collected brine is continuously separated from the solid impurities contained therein.

11. A process in accordance with claim 8, wherein said separation of said solid impurities from the collected brine is effected centrifugally.

12. In apparatus for making brine including a dissolving tank, a settling tank for receiving brine discharged from the dissolving tank, and means for separating solid impurities from the brine delivered to the settling tank, the improvement which comprises the provision of a substantially cylindrical settling tank connected to the bottom of the dissolving tank by means of a conduit adapted to discharge brine from said dissolving tank tangentially into the lower portion of said settling tank, and a centrifugal separator having an intake connected through a conduit to the interior of said settling tank above the discharge opening therein of said first mentioned conduit.

13. Apparatus for making brine, comprising a dissolving column having a substantially horizontal perforated support member across the interior and adjacent the bottom thereof for supporting a bed of rock salt, means for supplying dissolving water to said column above said support member and adjacent the top of said column, an open settling tank arranged entirely below said support member and adapted to receive brine discharged through said support member during a dissolving operation, and a centrifugal separator connected to said settling tank and adapted to withdraw brine from the latter for separating said brine from the solid impurities contained therein.

14. Apparatus for making brine comprising a tank having a substantially horizontal perforated support member across its interior and spaced above the floor of the tank for supporting a bed of salt, means for supplying dissolving water to the interior of said tank above said support member, an open reservoir tank, a conduit connecting the interior of said first-mentioned tank below said support member with said reservoir tank, whereby brine discharged through said support member is collected in said reservoir tank, said reservoir tank and said conduit being disposed entirely below said support member, and a centrifugal separator connected with said reservoir tank and adapted to withdraw brine therefrom and to separate solid impurities from said brine.

References Cited in the file of this patent
UNITED STATES PATENTS

| | | |
|---|---|---|
| 1,500,096 | Oxley | July 1, 1924 |
| 1,892,331 | Courthope et al. | Dec. 27, 1932 |
| 1,928,008 | Courthope | Sept. 26, 1933 |
| 2,009,667 | Keyes | July 30, 1935 |
| 2,072,385 | Schwartz | Mar. 2, 1937 |
| 2,270,372 | Hunter | Jan. 20, 1942 |
| 2,364,799 | Laughlin et al. | Dec. 12, 1944 |
| 2,734,804 | Courthope et al. | Feb. 14, 1956 |
| 2,740,707 | Herrmann | Apr. 3, 1956 |